US007917164B2

(12) United States Patent
Rao

(10) Patent No.: US 7,917,164 B2
(45) Date of Patent: Mar. 29, 2011

(54) REVERSE LINK POWER CONTROL

(75) Inventor: Anil M. Rao, Cedar Knolls, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 872 days.

(21) Appl. No.: 11/650,984

(22) Filed: Jan. 9, 2007

(65) Prior Publication Data

US 2008/0166976 A1  Jul. 10, 2008

(51) Int. Cl.
*H04B 7/00* (2006.01)
(52) U.S. Cl. ............... 455/522; 455/68; 455/69; 455/70
(58) Field of Classification Search ............... 455/69, 455/522, 67.11, 68, 70, 115.3, 126, 127.1, 455/127.2, 135, 226.3, 277.2, 296; 370/318
See application file for complete search history.

(56) References Cited

U.S. PATENT DOCUMENTS

| 2002/0077138 | A1* | 6/2002 | Bark et al. ............... 455/522 |
| 2004/0005906 | A1* | 1/2004 | Okumura et al. ............... 455/522 |
| 2006/0025080 | A1* | 2/2006 | Sutskover et al. ............... 455/69 |
| 2006/0183495 | A1 | 8/2006 | Soliman |
| 2006/0209767 | A1* | 9/2006 | Chae et al. ............... 370/335 |
| 2007/0129094 | A1* | 6/2007 | Jeong et al. ............... 455/522 |
| 2007/0129096 | A1* | 6/2007 | Okumura et al. ............... 455/522 |
| 2007/0201405 | A1* | 8/2007 | Santhanam ............... 370/335 |
| 2008/0008113 | A1* | 1/2008 | Cho et al. ............... 370/318 |
| 2008/0068981 | A1* | 3/2008 | Marinier ............... 370/208 |
| 2008/0188260 | A1* | 8/2008 | Xiao et al. ............... 455/522 |
| 2008/0233995 | A1* | 9/2008 | Shiu et al. ............... 455/522 |
| 2008/0261645 | A1* | 10/2008 | Luo et al. ............... 455/522 |
| 2009/0010242 | A1* | 1/2009 | Leung et al. ............... 370/345 |
| 2009/0143070 | A1* | 6/2009 | Shu et al. ............... 455/450 |
| 2009/0154425 | A1* | 6/2009 | Patil et al. ............... 370/332 |
| 2009/0227261 | A1* | 9/2009 | Tiirola et al. ............... 455/450 |

FOREIGN PATENT DOCUMENTS

WO  WO 03/067783  8/2003

OTHER PUBLICATIONS

Texas Instruments, "A Method for Uplink Open Loop Power Control Based on Signal Strength Measurements from Multiple Cells/Sectors", 3GPP TSG RAN WG1 Meeting #46, No. R1-062018, Aug. 28, 2006, Sep. 1, 2006, pp. 1-7, XP002485109, Tallinn, Estonia, Retrieved from the Internet: URL:http://www.3gpp.org/ftp/tsg_ran?WG1_RL1/TSGR1_46/Docs/>the whole document.
"Universal Mobile Telecommunications System (UMTS); Radio Resource Control (RRC); Protocol Specification (3GPP TS 25.331 Version 7.3.0 Release 7); ETSI TS 125 331", ETSI Standards, LIS, col. 3-R2, No. 7.3.0, Dec. 1, 2006, XP014040018, ISSN: 0000-0001, p. 248-252.

* cited by examiner

*Primary Examiner* — Dominic E Rego
*Assistant Examiner* — Duc Nguyen
(74) *Attorney, Agent, or Firm* — Harness, Dickey & Pierce

(57) ABSTRACT

In one embodiment, a reverse link transmission power for a user equipment is determined based on a first path loss and a second path loss. The first path loss is path loss between a serving station and the user equipment, and the serving station serves the communication needs of the user equipment. The second path loss is path loss between a neighboring station and the user equipment, and the neighboring station neighbors the serving station.

12 Claims, 5 Drawing Sheets

REVERSE LINK POWER CONTROL

BACKGROUND OF THE INVENTION

1. Field of the Invention

Example embodiments of the present invention relate generally to reverse link power control in a wireless communications network.

2. Description of the Related Art

A cellular communications network typically includes a variety of communication nodes coupled by wireless or wired connections and accessed through different types of communications channels. Each of the communication nodes includes a protocol stack that processes the data transmitted and received over the communications channels. Depending on the type of communications system, the operation and configuration of the various communication nodes can differ and are often referred to by different names. Such communications systems include, for example, a Code Division Multiple Access 2000 (CDMA2000) system and Universal Mobile Telecommunications System (UMTS).

UMTS is a wireless data communication and telephony standard which describes a set of protocol standards. UMTS sets forth the protocol standards for the transmission of voice and data between a base station (BS) or Node B and a mobile or User Equipment (UE). UMTS systems typically include multiple radio network controllers (RNCs). The RNC in UMTS networks provides functions equivalent to the Base Station Controller (BSC) functions in GSM/GPRS networks. However, RNCs may have further capabilities including, for example, autonomously managing handovers without involving mobile switching centers (MSCs) and Serving General Packet Radio Service (GPRS) Support Nodes (SGSNs). The Node B is responsible for air interface processing and some Radio Resource Management functions. The Node B in UMTS networks provides functions equivalent to the Base Transceiver Station (BTS) in GSM/GPRS networks. Node Bs are typically physically co-located with existing GSM base transceiver station (BTS) to reduce the cost of UMTS implementation and minimize planning consent restrictions.

FIG. 1 illustrates a conventional communication system 100 operating in accordance with UMTS protocols. Referring to FIG. 1, the communication system 100 may include a number of Node Bs such as Node Bs 120, 122 and 124, each serving the communication needs of UEs such as UEs 105 and 110 in their respective coverage area. A Node B may serve a coverage area called a cell, and the cell may be divided into a number of sectors. For ease explanation, the terminology cell may refer to either the entire coverage area served by a Node B or a single sector of a Node B. Communication from a Node B to a UE is referred to as the forward link or downlink. Communication from a UE to a Node B is referred to as the reverse link or uplink.

The Node Bs are connected to an RNC such as RNCs 130 and 132, and the RNCs are connected to a MSC/SGSN 140. The RNC handles certain call and data handling functions, such as, as discussed above, autonomously managing handovers without involving MSCs and SGSNs. The MSC/SGSN 140 handles routing calls and/or data to other elements (e.g., RNCs 130/132 and Node Bs 120/122/124) in the network or to an external network. Further illustrated in FIG. 1 are conventional interfaces Uu, Iub, Iur and Iu between these elements.

A fractional power control scheme has been proposed for controlling the mobile or UE transmission power on the reverse link of the 3GPP LTE standard. This open loop fraction power control technique proposes setting the UE transmit power spectral density such that a fraction of the path loss (including shadowing) may be compensated. Namely, the UE transmit power spectral density TxPSD_dBm may be established as:

$$\text{TxPSD\_dBm} = \min(\text{Max\_TxPSD\_dBm}, \text{Target\_SINR\_dB} + \text{PathLoss\_dB} + \text{UL\_Interference\_dBm}) \quad (1)$$

where

Max_TxPSD_dBm is the maximum UE transmit power spectral density (power per tone), which is a function of the UE power class and the assigned transmission bandwidth (for example, the 21 dBm UE power class assigned a single resource unit of 12 subcarriers will have a maximum transmit power per tone of 10.21 dBm);

UL_Interference_dBm is the reverse or uplink interference measured by a Node B serving the UE (typically, this the Node B determines this as total received energy minus the energy received from UEs being served by the Node B), and is reported to the UE, for example, over a control channel;

PathLoss_dB is the path loss between the Node B and the UE; and

Target_SINR_dB is the target signal-to-noise ratio (SINR) per antenna per tone. The fractional power control scheme available in the literature sets the target SINR to be a function of the path loss to the serving cell as follows:

$$\text{Target\_SINR\_dB} = A + (B-1)*(\text{PathLoss\_dB}) \quad (2)$$

where A and B are design parameters. Ignoring the Max_TxPSD_dBm limitation in (1), the UE transmit power spectral density is given by:

$$\text{TxPSD\_dBm} = A + B*\text{PathLoss\_dB} + \text{UL\_Interference\_dBm} \quad (3)$$

Note that if B=0, there is no compensation for the path loss and all UEs transmit with the same transmit power spectral density (possible maximum power), which results in high interference levels and poor cell edge performance. If B=1, this is traditional slow power control in which the path loss is fully compensated and all UEs are received with the same SINR. This results in poor spectral efficiency. By setting 0<B<1, only a fraction of the path loss is compensated, which provides flexibility in balancing spectral efficiency and cell edge performance.

SUMMARY OF THE INVENTION

At least one problem with open loop fractional power control as described above is that it does not directly take into consideration the amount of interference a UE will generate to a neighbor cell/sector. At least one embodiment of the present invention makes use of the level of interference a UE will generate to its neighbor cell/sector in determining the transmit power spectral density for the UE. Accordingly, advantages include allowing for smaller variance in the interference distribution, higher throughput, and/or etc.

In one embodiment, a reverse link transmission power for a user equipment is determined based on a first path loss and a second path loss. The first path loss is path loss between a serving station and the user equipment, and the serving station serves the communication needs of the user equipment. The second path loss is path loss between a neighboring station and the user equipment, and the neighboring station neighbors the serving station.

In another embodiment, user equipment measures received downlink power from a serving station. The serving station serves the communication needs of the user equipment. The user equipment also measures received downlink power from a neighboring station. The neighboring station neighbors the serving station. The user equipment determines a reverse link transmission power based on the measured received downlink power from the serving station and the measured received downlink power from the neighboring station.

BRIEF DESCRIPTION OF THE DRAWINGS

The present invention will become more fully understood from the detail description given herein below and the accompanying drawings which are given by way of illustration only, wherein like reference numerals designate corresponding parts in the various drawings, and wherein.

DETAILED DESCRIPTION OF EXAMPLE EMBODIMENTS

Figure 1:
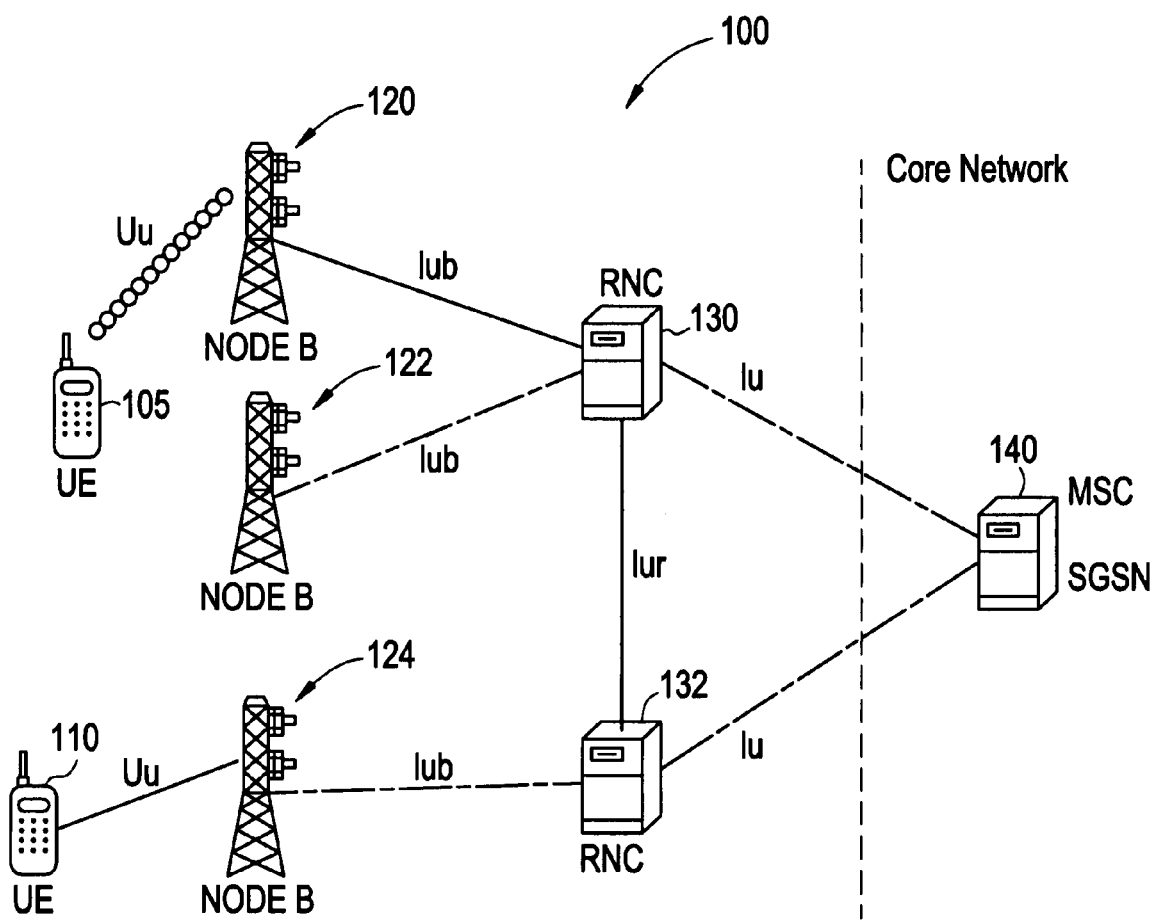
FIG. 1 illustrates a conventional communication system 100 operating in accordance with UMTS protocols.

Example embodiments of the present invention will be described with respect to the UMTS system illustrated in FIG. 1. However, it will be understood that the present invention is not limited to this system or to UMTS systems.

Figure 2:
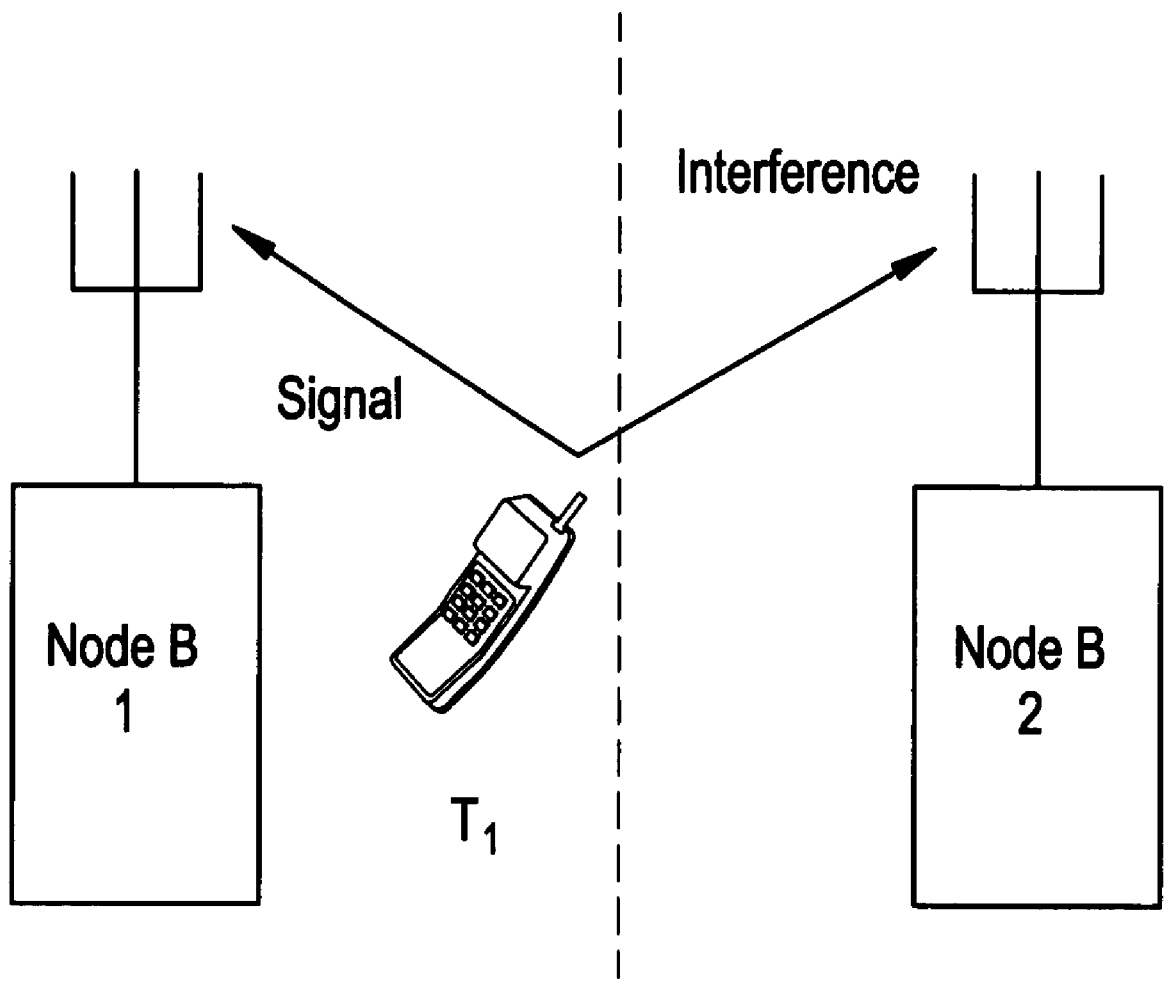
FIG. 2 illustrates an example where a UE may cause interference in a neighboring cell.

As discussed above, one problem with open loop fractional power is that it does not directly take into consideration the amount of interference a UE will generate to a neighbor cell/sector. For example, FIG. 2 illustrates an example where a UE may cause interference in a neighboring cell/sector (hereinafter collectively referred to as a cell). In FIG. 2, UE T1 is served by Node-B 1 and generates interference to Node-B 2. However, if UE T1 has a strong shadow fade to Node-B 2, then it should be allowed to transmit at a higher transmit power spectral density as compared to the case when UE T1 has a small shadow fade to Node-B 2. Another example is the case of a non-homogeneous deployment in which Node-B 2 has a much larger cell radius, in which case UE T1 should be allowed to transmit at higher power levels.

According to one embodiment, the open loop fractional power control method may be modified as follows: the target SINR may be set as a function of the path loss difference between the serving cell/serving Node B and the strongest neighbor cell/neighbor Node B. For example, one embodiment determines this modified target SINR, Modified_Target_SINR_dB, as follows:

$$\text{Modified\_Target\_}_{SINR}\text{\_dB} = \min(A + B^*(\text{PathLoss\_Diff\_dB}), \text{Max\_Target\_}_{SINR}\text{\_dB}) \quad (4)$$

where PathLoss_Diff_dB is the difference in path loss (including shadowing) between the strongest neighbor Node B and the current serving Node B. This measurement may easily be made by determining the ratio of the received downlink pilot power measurements as follows:

$$\text{PathLoss\_Diff\_dB} = 10^*\log_{10}(\text{DL}\_{Rx}\_\text{PilotPower\_ServingCell}/ \text{DL}\_{Rx}\_\text{PilotPower\_StrongestNeighborCell}) \quad (5)$$

where DL_Rx_PilotPower_ServingCell is the received downlink pilot power from the serving Node B and DL_Rx_PilotPower_StrongestNeighborCell is the received downlink pilot power from the strongest neighbor Node B. The quantity in parenthesis is simply referred to as the downlink pilot power ratio (PPR). In equation (4), the intercept parameter A specifies the target SINR at the "cell edge" (i.e., when PathLoss_Diff_dB=0). The positive slope parameter B specifies how quickly the target SINR increases as the UE moves towards the cell interior, and hence controls the fairness of the power control scheme. Max_Target_SINR_dB is the maximum allowable target SINR.

Figure 3:
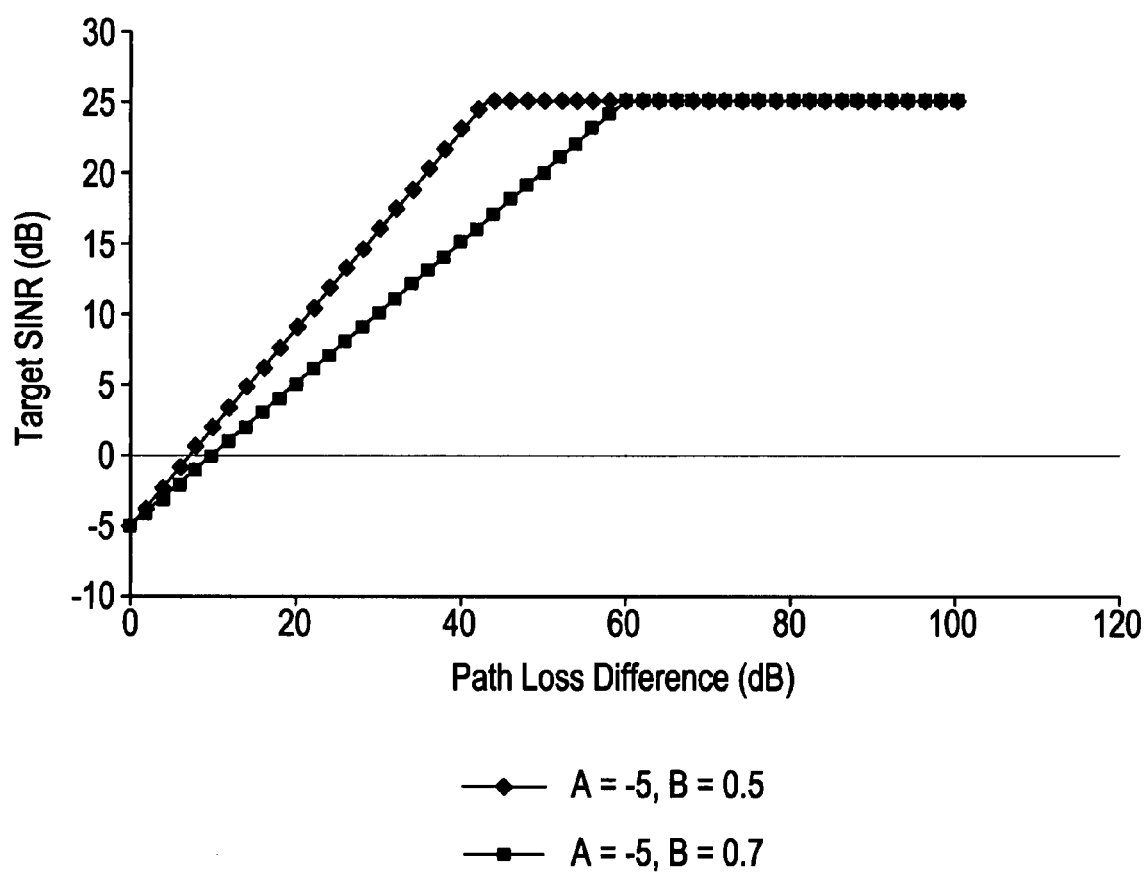
FIG. 3 illustrates a graph of the target SINR versus path loss for first and second example sets of intercept parameter and the fairness parameter.

FIG. 3 illustrates a graph of the target SINR versus path loss for first and second example sets of intercept parameter A and the fairness parameter B. In particular, FIG. 3 is an illustration of increasing target SINR as the path loss difference between the serving cell and the strongest non-serving cell increases (i.e., as the UE moves towards the interior of the cell). FIG. 3 includes a first curve represented by diamonds for when the intercept parameter is −5 and the fairness parameter is 0.5, and includes a second curve represented by squares for when the intercept parameter is −5 and the fairness parameter is 0.7. As shown, larger values of the fairness parameter B are more aggressive at increasing the target SINR for high geometry users.

Figure 4:
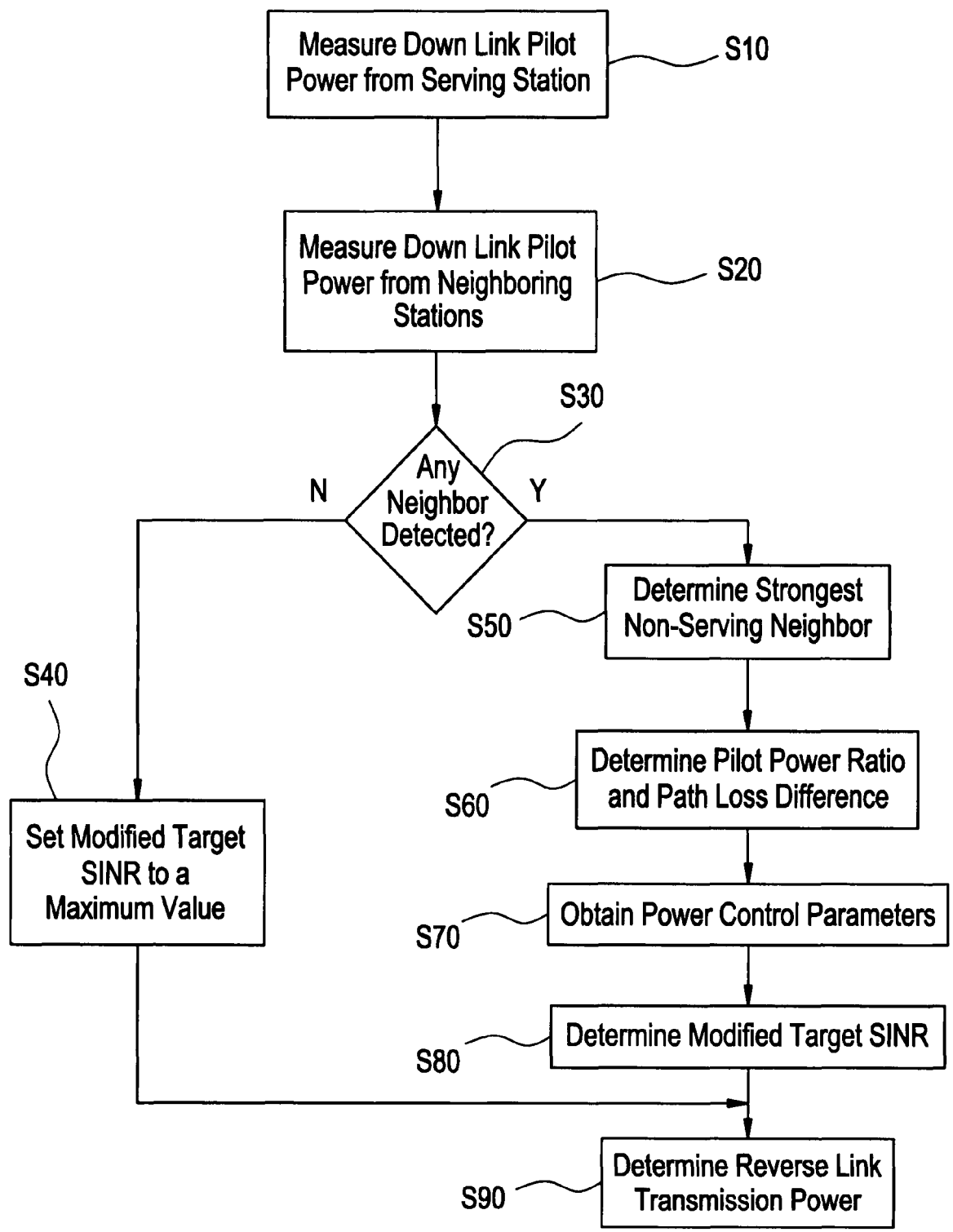
FIG. 4 illustrates a flow chart of the process performed by a UE in determining the transmit power spectral density according to an embodiment of the present invention.

FIG. 4 illustrates a flow chart of the process performed by a UE in determining the transmit power spectral density level, which will also be referred to herein as the reverse link power. As shown, in step S10, the UE measures the received downlink pilot power from the current serving station (e.g., the Node B currently handing the communication needs of the UE). Often times, this is expressed as measuring the received downlink pilot power from the serving sector or cell. This measurement may be made on the order of every 100 ms-200 ms, and the received pilot power will be averaged over this interval so as to average out the affects of fast fading. Then, in step S20, the UE measures the received downlink pilot power from any other neighboring station (e.g., Node Bs with coverage areas (cell or sector) adjacent to the serving Node B) within its receiving range. Often times, this is expressed as measuring the received downlink pilot power from the neighboring sector or cell. This measurement may be made on the order of every 100 ms-200 ms, and the received pilot power will be averaged over this interval so as to average out the affects of fast fading.

In step S30, the UE determines whether any neighboring stations were detected in step S20. If not, in step S40, the UE sets a modified target SINR to a maximum permitted value (see step S70). However, if a neighbor station was detected in step S20, the UE determines in step S50 the strongest non-serving neighbor as the one with the highest received downlink pilot power detected in step S20. In step S60, the UE computes the pilot power ratio (PPR) as the received downlink pilot power from the serving sector divided by the received downlink pilot power from the strongest non-serving sector. Then, the UE determines the path loss difference in dB scale as PathLoss_Diff_dB=10*log 10(PPR).

The serving station broadcasts fractional power control parameters A, B, uplink interference, and Max_Target_SINR_dB on a broadcast channel such that all UEs being served by this station can decode the parameters. Accordingly, in step S70, the UE obtains these values. However, it will be appreciated the obtaining these values may occur before the process or concurrently with any step of the process.

Then, in step S80, the UE computes the modified target SINR according to expression (5).

After either step S40 or S80, the UE, in step S90 determines the transmit power spectral density according to expression (1) using the modified target SINR as shown in expression (6) below:

$$Tx\_PSD\_dBm = min(Max\_Tx\_PSD\_dBm, Modified\_Target\_SINR\_dB + PathLoss\_dB + UL\_Interference\_dBm) \quad (6)$$

where PathLoss_dB is the measured path loss to the serving station as in expression (1).

Using the system simulation assumptions listed in Table 1 below, the performance of fractional power control using path loss only (as in equation 1) and using the pilot power ratio measurement (as in equation 6) were simulated. For the fractional power control schemes, a range of values for B was chosen to illustrate the tradeoff between cell throughput and cell edge rates. For each value of B, A was chosen in order to get a median IoT (interference over thermal) operating point of 4.5 dB. In practice, the desired IoT operating point may be dictated by link budget requirements of reverse link control channels. In both of the fractional power control cases, a maximum target SINR of 25 dB was used.

TABLE 1

System Simulation Assumptions

| Parameter | Assumption. |
|---|---|
| Transmission Bandwidth | 5 MHz FDD |
| Cellular Layout | Hexagonal grid, 19 cell sites, 3 sectors per site |
| Inter-site distance | 2500 meters |
| Losses (cable loss, body loss, etc.) | 7 dB |
| Distance-dependent path loss | COST 231 HATA model $L = 139.6 + 35.7\log_{10}(.R)$, R in kilometers |
| Lognormal Shadowing | Similar to UMTS 30.03, B 1.4.1.4 |
| Shadowing standard deviation | 8 dB |
| Correlation distance of Shadowing | 50 m |
| Shadowing correlation  Between cells | 0.5 |
| Shadowing correlation  Between sectors | 1.0 |
| Antenna pattern (horizontal) (For 3-sector cell sites with fixed antenna patterns) | Kathrein antenna pattern, 65 degree beamwidth, 17.1 dBi antenna gain |
| Carrier Frequency/Bandwidth | 1.9 GHz/5 MHz |
| Channel model | GSM TU, 3 km/hr |
| Total BS TX power (Ptotal) | 43 dBm |
| UE power class | 21 dBm (125 mW). |
| Inter-cell Interference Modelling | Explicit modelling (all cells occupied by UEs) |
| Antenna Bore-sight points toward flat side of cell (for 3-sector sites with fixed antenna patterns) |  |
| Users dropped uniformly in entire cell |  |
| Minimum distance between UE and cell | >= 35 meters |
| MCS Levels in Scheduler | QPSK R = 1/8, 1/4, 1/3, 1/2, 2/3, 3/4  16 QAM R = 1/2, 2/3, 3/4, 7/8 |
| HARQ | Max of 8 Tx, Target 20% BLER on first Tx. HARQ RTT = 5 ms Num HARQ Processes = 10 |

TABLE 1-continued

System Simulation Assumptions

| Parameter | Assumption. |
|---|---|
| Reuse scheme | Reuse-1, no fractional frequency reuse or interference avoidance applied |
| Num UEs Per Cell | 10 |
| Traffic Model | Full Buffer |
| Scheduling scheme | Proportional Fair, 500 ms time constant. Scheduling is frequency selective based on uplink CQI pilot, only localized subcarrier allocations are used without any frequency hopping. |
| Modeling of Channel Estimation | Non-ideal, assumes one-shot channel estimation over TTI (=1 ms) |
| L1/L2 Control Signaling Modeled | No |
| Link to System Mapping | Effective Code Rate Method |
| Open loop fractional power control assumptions | Ideal measurement of path loss (including shadowing) |

Figure 5:
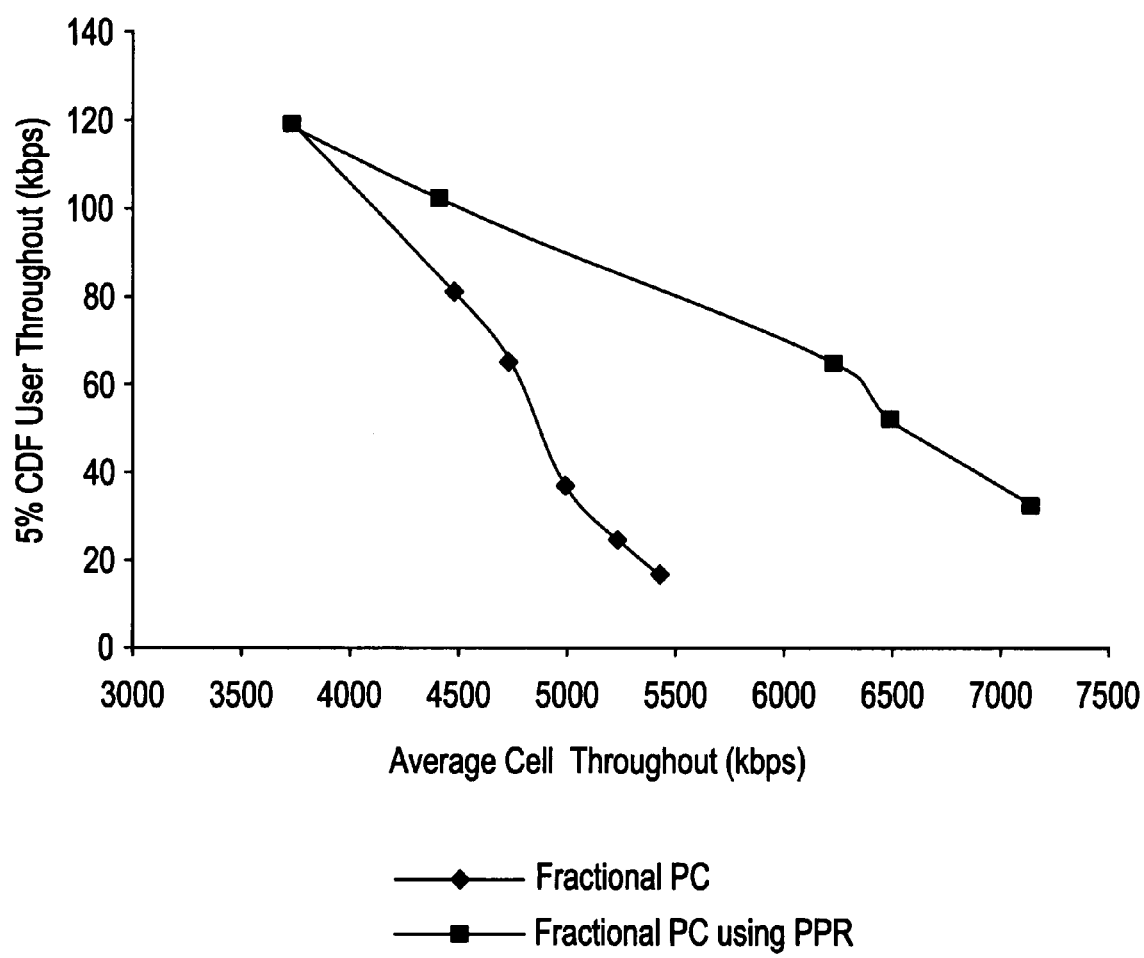
FIG. 5 illustrates the performance of the power control schemes for the assumptions listed in Table 1 below, presented as cell edge rate (defined as the 5% CDF user throughput) vs. average cell throughput.

FIG. 5 illustrates the performance of the power control schemes for the assumptions listed in Table 1, presented as cell edge rate (defined as the 5% CDF user throughput) vs. average cell throughput. Note that the performance of fractional power control significantly improves by making use of the difference in path loss from the serving cell to the strongest neighbor cell, as compared to the case of using only the path loss to the serving cell alone. That is, for a given cell edge rate, a higher cell throughput can be obtained; or for a given cell throughput, a higher cell edge rate can be obtained.

Open loop fractional power control using the path loss difference between the serving cell and the strongest neighbor cell provides significantly improved performance as compared to using the path loss from the serving cell alone The invention being thus described, it will be obvious that the same may be varied in many ways. For example, the parameters A and B may be fixed, set by a system operator, updated by a system operator, adapted to change based on factors such as load, time of day, etc. Such variations are not to be regarded as a departure from the invention, and all such modifications are intended to be included within the scope of the invention.

I claim:

1. A method of reverse link power control, comprising:
   determining a reverse link transmission power for a user equipment based on a difference between a first path loss and a second path loss, the first path loss being path loss between a serving station and the user equipment, the serving station serving the communication needs of the user equipment, and the second path loss being path loss between a neighboring station and the user equipment, the neighboring station neighboring the serving station, the difference being determined based on a ratio between a received downlink power from the serving station and a received downlink power from the neighboring station; and
   determining a target signal-to-noise ratio (SINR) for the user equipment based on the determined path loss difference,
   wherein the determining a target SINR step determines the target SINR based on the determined path loss difference, a first parameter and a second parameter, the first parameter specifies a desired target SINR at an edge of a coverage area of the serving station, and the second parameter specifies how quickly the target SINR increases as the user equipment moves towards an interior of the coverage area.

2. The method of claim 1, further comprising:
measuring received downlink power from a plurality of neighboring stations;
determining one of the plurality of neighboring stations with a greatest received downlink power; and wherein
the second pass loss is between the neighboring station with the greatest received downlink power and the user equipment.

3. The method of claim 1, wherein the neighboring station is a neighboring station with a greatest received downlink power at the user equipment.

4. The method of claim 1, wherein
the determining a reverse link transmission power step determines the reverse link transmission power based on the determined target SINR.

5. The method of claim 4, wherein the determining a target SINR step determines the target SINR as follows:

target SINR=min(A+B*(PathLoss_Diff), Max_Target_SINR)

where the PathLoss_Diff is the path loss difference, A is the first parameter, B is the second parameter, and Max_Target_SINR is a maximum target SINR.

6. The method of claim 5, wherein the determining a reverse link transmission power step determines the reverse link transmission power as follows:

reverse link transmission power=min(maximum transmission power, target SINR+first path loss+UL_Interference)

where the UL_interference is uplink interference at the serving station.

7. The method of claim 4, wherein the determining a reverse link transmission power step determines the reverse link transmission power based on the path loss difference and uplink interference at the serving station.

8. A method of reverse link power control, comprising:
measuring, at user equipment, received downlink power from a serving station, the serving station serving the communication needs of the user equipment;
measuring, at the user equipment, received downlink power from a neighboring station, the neighboring station neighboring the serving station;
determining a reverse link transmission power for the user equipment based on a ratio between the measured received downlink power from the serving station and the measured received downlink power from the neighboring station; and
determining a target signal-to-noise ratio (SINR) for the user equipment based on the ratio between the measured received downlink power from the serving station and the measured received downlink power from the neighboring station,
wherein the determining a target SINR step determines the target SINR based on the ratio between the measured received downlink power from the serving station and the measured received downlink power from the neighboring station, a first parameter and a second parameter, the first parameter specifies a desired target SINR at an edge of a coverage area of the serving station, and the second parameter specifies how quickly the target SINR increases as the user equipment moves towards an interior of the coverage area.

9. The method of claim 8, wherein the neighboring station is a neighboring station with a greatest received downlink power at the user equipment.

10. The method of claim 8, wherein
the determining a reverse link transmission power step determines the reverse link transmission power based on the determined target SINR.

11. The method of claim 10, wherein the determining a reverse link transmission power step determines the reverse link transmission power based on the determined target SINR and a path loss between the serving station and the user equipment.

12. The method of claim 11, wherein the determining a reverse link transmission power step determines the reverse link transmission power based on the determined target SINR, a path loss between the serving station and the user equipment, and an uplink interference at the serving station.

* * * * *